(12) United States Patent
Levola

(10) Patent No.: US 8,320,032 B2
(45) Date of Patent: Nov. 27, 2012

(54) DIFFRACTIVE BEAM EXPANDER AND A VIRTUAL DISPLAY BASED ON A DIFFRACTIVE BEAM EXPANDER

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 12/602,561

(22) PCT Filed: Jun. 4, 2007

(86) PCT No.: PCT/FI2007/050322
§ 371 (c)(1),
(2), (4) Date: Dec. 1, 2009

(87) PCT Pub. No.: WO2008/148927
PCT Pub. Date: Dec. 11, 2008

(65) Prior Publication Data
US 2010/0214659 A1 Aug. 26, 2010

(51) Int. Cl.
*G03H 1/00* (2006.01)
*G03H 1/22* (2006.01)
(52) U.S. Cl. ............... 359/34; 359/15; 359/13; 385/37
(58) Field of Classification Search .............. 359/15, 359/34, 569, 630, 13; 385/37, 133
See application file for complete search history.

(56) References Cited

U.S. PATENT DOCUMENTS

| | | | |
|---|---|---|---|
| 5,224,198 A * | 6/1993 | Jachimowicz et al. | 385/133 |
| 6,580,529 B1 | 6/2003 | Amitai et al. | |
| 6,882,479 B2 * | 4/2005 | Song et al. | 359/630 |
| 2003/0067685 A1 | 4/2003 | Niv | |
| 2005/0180687 A1 | 8/2005 | Amitai | |
| 2006/0126182 A1 * | 6/2006 | Levola | 359/569 |
| 2006/0132914 A1 * | 6/2006 | Weiss et al. | 359/462 |

FOREIGN PATENT DOCUMENTS

| | | |
|---|---|---|
| EP | 0 535 402 A1 | 4/1993 |
| WO | WO 2006/064301 | 6/2006 |
| WO | WO 2006/064334 A1 | 6/2006 |

OTHER PUBLICATIONS

International Search Report of PCT/FI2007/050322—Date of Completion of Search: Oct. 19, 2007.

\* cited by examiner

*Primary Examiner* — Audrey Y Chang
(74) *Attorney, Agent, or Firm* — Locke Lord LLP

(57) ABSTRACT

A diffractive beam expander (50) comprises a substantially planar waveguiding substrate, an input grating (10) to provide an in-coupled beam (B1) propagating within said substrate, and an output grating (30) to provide an out-coupled beam. The expander (50) comprises also four or more further grating portions to expand the height of the in-coupled beam (B1). A part of the in-coupled light is diffracted by a first deflecting grating portion (21a) to provide a first deflected beam. A part of the in-coupled light is diffracted by a second deflecting grating portion (22a) to provide a second deflected beam. The first deflected beam propagates downwards and the second deflected beam propagates upwards with respect to the in-coupled beam (B1). The first deflected beam impinges on a first direction-restoring grating portion (21b) and the second deflected beam impinges on a second direction-restoring grating portion (22b). The first restoring grating portion (21b) provides a first restored beam (V1) and the second restoring grating portion (22b) provides a second restored beam (V2), which both have the same direction as the in-coupled beam (B1). Out-coupling provides an output beam which is parallel to the input beam, and has a greater vertical dimension than said input beam.

13 Claims, 14 Drawing Sheets

DIFFRACTIVE BEAM EXPANDER AND A VIRTUAL DISPLAY BASED ON A DIFFRACTIVE BEAM EXPANDER

FIELD OF THE INVENTION

The present invention relates to expanding light beams by diffractive elements. The present invention relates also to displaying virtual images.

BACKGROUND

Display modules are used in portable devices to display information in graphical form. Small size is an important aspect in portable devices. However, the small size of a portable device also sets a limitation to the size of a display incorporated in said device. A typical drawback of a conventional small display is that an observer can examine only a small portion of a large displayed image at a glance, while preserving adequate resolution.

Large images may be displayed by a small device e.g. when the device comprises a near-eye virtual display. An imaging optics may convert a small real image generated by a micro-display into a virtual image. An observer may place the device near his eye such that when light provided by the imaging optics impinges on his eye, he perceives an impression of a large detailed virtual image displayed at an infinite distance.

The micro-display and the imaging optics may be made even smaller and/or lightweight when the light beam provided by the imaging optics is expanded by using a diffractive beam expander, which is also known as an exit pupil expander (EPE). A near-eye display based on a diffractive beam expander is disclosed e.g. in a patent application EP0535402. U.S. Pat. No. 6,580,529 discloses a diffractive beam expander for expanding a light beam in two dimensions, i.e. horizontally and vertically.

US 2006/0126182 discloses a diffractive beam expander comprising a first diffractive element to couple light into a substrate, a second diffractive element to couple light out of the substrate, and an intermediate diffractive element to diffract in-coupled light towards the second diffractive element. The intermediate diffractive element has a substantially periodic pattern composed of substantially linear elements for producing conical diffraction.

SUMMARY

An object of the invention is to provide a diffractive beam expander for expanding a light beam in two dimensions. A further object of the invention is to provide a device for displaying virtual images.

According to a first aspect of the invention, there is provided a diffractive beam expander according to claim 1.

According to a second aspect of the invention, there is provided a method for expanding a light beam according to claim 8.

According to a third aspect of the invention, there is provided a device for displaying virtual images according to claim 10.

According to a fourth aspect of the invention, there is provided a method for displaying virtual images according to claim 12.

According to a fifth aspect of the invention, there is provided beam expanding means according to claim 14.

A diffractive beam expander comprises a substantially planar waveguiding substrate, an input grating to provide an in-coupled beam propagating within said substrate by diffracting light of an input beam into said substrate, and an output grating to provide an out-coupled beam by diffracting in-coupled light out of said substrate. The expander comprises also four or more further grating portions to expand the height of the in-coupled beam. A part of the in-coupled light is diffracted by a first beam-deflecting grating portion to provide a first deflected beam. A part of in-coupled light is diffracted by a second beam-deflecting grating portion to provide a second deflected beam. The first deflected beam propagates downwards with respect to the original in-coupled beam and the second deflected beam propagates upwards with respect to the original in-coupled beam. The first deflected beam impinges on a first direction-restoring grating portion and the second deflected beam impinges on a second direction-restoring grating portion. The first restoring grating portion provides a first restored beam which has the same direction as the original in-coupled beam and which is shifted downwards with respect to the original in-coupled beam, and the second restoring grating portion provides a second restored beam which has the same direction as the original in-coupled beam and which is shifted upwards with respect to the original in-coupled beam. Thus, the in-coupled beam is effectively expanded in the vertical direction. Out-coupling of said expanded in-coupled beam provides an output beam which is parallel to the input beam, wherein said output beam also has a greater vertical dimension than said input beam.

A device, in particular a portable device, may comprise the diffractive beam expander in order to expand the exit pupil of a virtual display.

According to an embodiment of the present invention, the number of interactions between propagating light and the grating structures may be reduced, which may lead to improved parallelism of the out-coupled light beam, i.e. to an improved output beam quality.

According to an embodiment of the present invention, the number of interactions between propagating light and the grating structures may be reduced. Consequently, greater deviations from parallelism of the surfaces of the waveguiding substrate may be allowed, while still preserving an adequate output beam quality.

According to an embodiment of the present invention, the number of interactions between propagating light and the grating structures may be reduced. Consequently, the waveguiding substrate may even be slight bent, while still preserving an adequate output beam quality. A bent waveguiding substrate may be used e.g. in order to show a virtual image with an apparent focus which is only a few meters away from the viewer, instead of being at an infinite distance. In other words, light rays constituting a slightly diverging beam provided by said bent waveguiding substrate may converge at a distance which is only a few meters from said substrate.

The deflecting and restoring grating portions may be implemented on the same plane as the input grating and/or the output grating, which facilitates producing of the diffractive beam expander.

The embodiments of the invention and their benefits will become more apparent to a person skilled in the art through the description and examples given herein below, and also through the appended claims.

BRIEF DESCRIPTION OF THE FIGURES

In the following examples, the embodiments of the invention will be described in more detail with reference to the appended drawings, in which.

DETAILED DESCRIPTION

Figure 1:
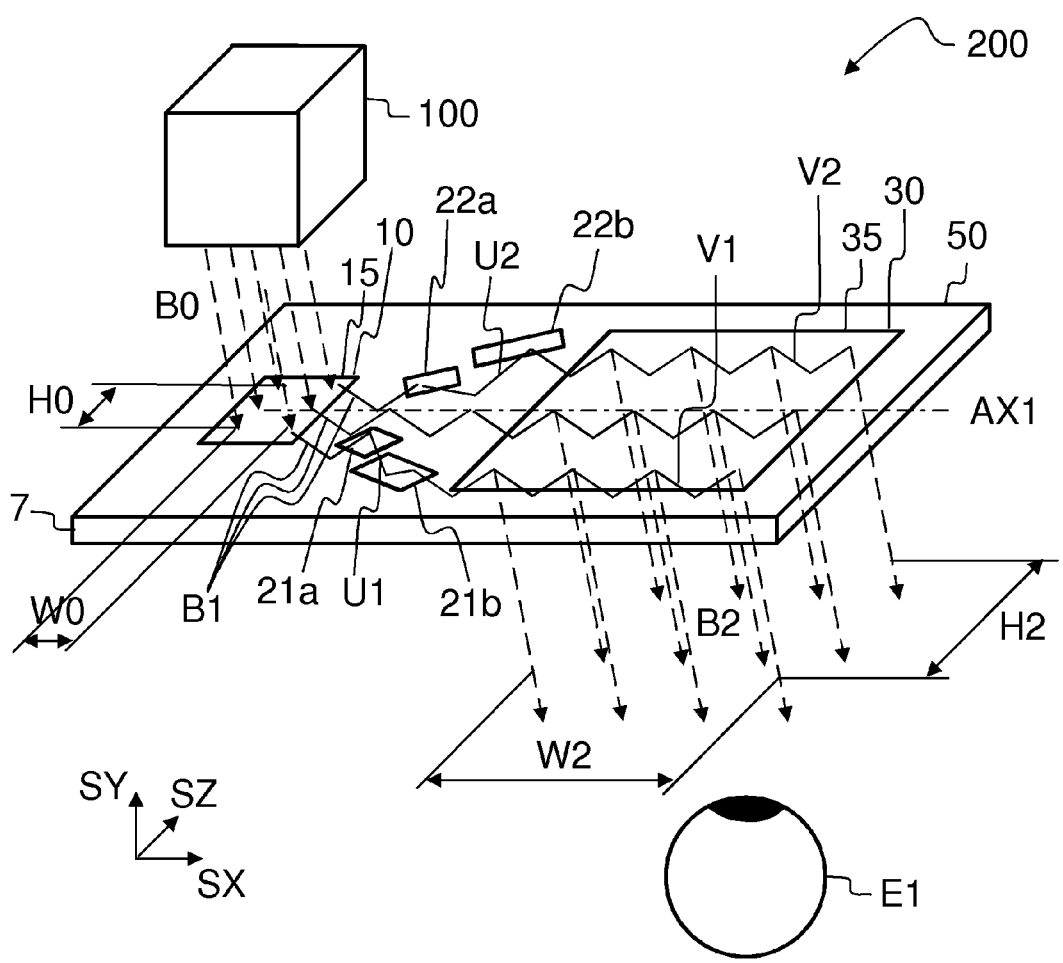
FIG. 1 shows, in a three dimensional view, an optical engine and a diffractive beam expander.
Figure 2A:
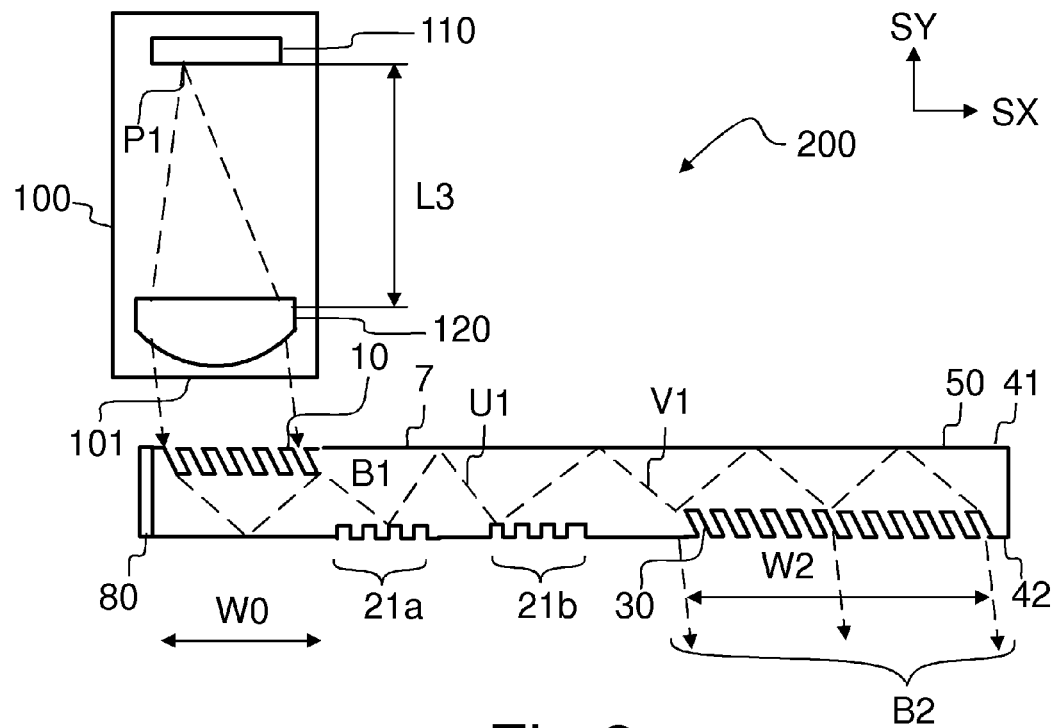
FIG. 2a shows an optical engine and a diffractive beam expander.

Referring to FIG. 1, a virtual display device 200 may comprise an optical engine 100 and a diffractive beam expander 50. The optical engine 100 may comprise a micro-display 110 and imaging optics 120 (FIG. 2a). The imaging optics 120 converts a real image 605 (FIG. 2b) formed by the micro-display 110 into a virtual image 710 (FIG. 14) which is observable through a viewing aperture 35 of the diffractive beam expander 50.

The diffractive beam expander 50 may comprise an input grating 10, two or more beam-deflecting grating portions 21a, 22a, two or more direction-restoring portions 21b, 22b, and an output grating 30. The gratings 10, 30 and the grating portions 21a, 22a, 21b, 22b may be implemented on a substantially planar transparent substrate 7. The substrate 7 has a first substantially planar surface and a second substantially planar surface which is substantially parallel to said first planar surface.

The substrate 7 is waveguiding, which means that in-coupled light may propagate within said substrate 7 such that said propagating light may be confined to said substrate 7 by total internal reflections (TIR).

The optical engine 100 provides an input beam B0. The input beam B0 impinging on the input grating 10 may be coupled into the substrate 7 such that a corresponding in-coupled beam B1 propagates within said substrate towards the beam-deflecting portions 21a, 22a.

The planar surfaces of the waveguiding substrate 7 are in planes defined by the orthogonal directions SX and SZ. The direction SY is perpendicular to the directions SX and SZ.

A part of the in-coupled beam B1 impinges on a first beam-deflecting grating portion 21a, which diffracts light towards a first direction-restoring grating portion 21b providing a first deflected light beam U1. The restoring portion 21b diffracts light of the beam U1 providing a first restored light beam V1. The restored beam V1 has been shifted with respect to the original in-coupled beam B1 and it propagates substantially in the same direction as the original in-coupled beam B1.

A part of the in-coupled beam B1 impinges on a second beam-deflecting grating portion 22a, which diffracts light towards a second direction-restoring grating portion 22b providing a second deflected light beam U2. The restoring portion 22b diffracts light of the beam U2 providing a second restored light beam V2. The restored beam V2 has been shifted with respect to the original in-coupled beam B1 it and propagates substantially in the same direction as the original in-coupled beam B1.

A part of the in-coupled beam B1 may propagate within the substrate 7 without being diffracted by the portions 21a, 21b, 22a, 22b.

The undiffracted part of the beam B1, the restored beam V1 and/or the restored beam V2 may together form an enlarged light beam which propagates in the same direction as the original in-coupled beam B1.

The enlarged beam may be subsequently coupled out of the substrate 7 by the output grating 30 to provide an output beam B2 which is expanded in two directions SX and SZ when compared to the input beam B0. The output beam B2 may impinge on the eye E1 of an observer.

The height H2 of the output beam B2 is greater than the height H0 of the input beam B0. Thus, the diffractive beam expander 50 provides beam expanding in the vertical direction SZ. (The direction SZ is vertical in the operating position shown in FIG. 14). The width W2 of the output beam B2 may be greater than the width W0 of the input beam B0. The maximum height H2 and the maximum width W2 of the output beam B2 are limited by the dimensions of the viewing aperture 35. The height and the width of the input grating 10 may be selected to be substantially equal to or grater than the dimensions of the input beam B0, in order to maximize the efficiency of coupling light into the substrate 7.

The gratings 10, 30 and the grating portions 21a, 21b, 22a, 22b are diffractive elements. The gratings and the grating portions may be e.g. surface relief gratings implemented by molding or embossing on either of the planar surfaces 41, 42 (FIG. 2a). The profile of the gratings may be e.g. sinusoidal, binary rectangular, or blazed. Yet, the profile of the gratings may be binary slanted or sinusoidal slanted. One or more gratings 10, 30, and/or portions 21a, 21b, 22a, 22b may be embedded in the substrate 7. The diffractive beam expander 50 may further comprise auxiliary grating portions (see e.g. FIG. 9). The gratings 10, 30 and the grating portions 21a, 21b, 22a, 22b may be in one or more planes defined by the directions SX and SZ.

A midline AX1 may pass e.g. through the center of the aperture 15 of the input grating 10 and through the center of the aperture 35 of the output grating 30. The gratings 10, 30 and the portions 21a, 21b, 22a, 22b may be symmetrically positioned with respect said midline AX1. However, the midline AX1 may also be selected such that the gratings 10, 30 are not symmetrically positioned with respect to said midline AX1.

Referring to FIG. 2a, the optical engine 100 may comprise a micro-display 110 and imaging optics 120. The imaging optics may comprise one or more optical elements such as lenses, mirrors, prisms or diffractive elements. Light rays transmitted from a point P1 of the micro-display are substantially collimated by the imaging optics 120 to form parallel rays of light which constitute the beam B0 provided by the optical engine 100. The distance L3 between the micro-display 110 and the imaging optics 120 is set such that the pixels of the micro-display 110 are substantially at the focal distance of the imaging optics 120. A plurality of beams B0 are provided in order to display a virtual image, which consists of a plurality of pixels.

At least one beam B0 transmitted from the output aperture 101 of the optical engine 100 impinges on the input grating 10 of the diffractive beam expander 50. Light of the input beam B0 is coupled into the waveguiding substrate 7 by the input grating 10. The in-coupled light propagates within the substrate 7 as the in-coupled beam B1. A part of the in-coupled beam B1 interacts with the first deflecting grating portion 21a providing the deflected beam U1. A part of the deflected beam U1 interacts with the restoring grating portion 21b providing the first restored beam V1. A part of the in-coupled beam B1 remains undiffracted (not shown in FIG. 2a). Thus, a part of the original in-coupled beam B1 may contribute to the second restored beam V2 (not shown in FIG. 2a). The output grating 30 diffracts the expanded output beam B2 towards the eye E1 of the observer.

Figure 14:
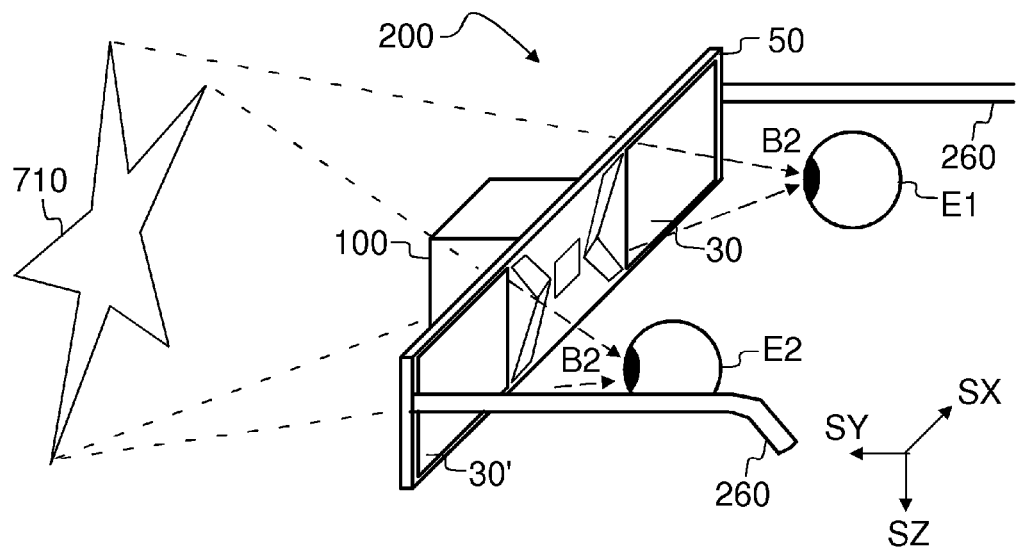
FIG. 14 shows, in a three dimensional view, a bi-ocular display device for showing virtual images.

The enlarged light beams B2 provided by the diffractive beam expander 50 provide for a viewer and impression of a virtual image 710 displayed at an infinite distance from the viewer. As a phenomenon, human viewers typically perceive that the displayed virtual image 710 is only a few meters away from them, despite the infinite distance. The virtual image 710 may be e.g. a star pattern, as shown in FIG. 14.

The diffractive beam expander 50 may be mono-ocular, i.e. it may have only one output grating 30. The input grating 10, the output grating 30 and or the grating portions 21a, 21b, 22a, 22b may be slanted or blazed surface relief gratings in order to maximize the efficiency of coupling light into the substrate 7 and out of the substrate 7. The diffractive beam expander 50 may comprise one or more optically absorbing structures 80 to eliminate stray light.

The substrate 7 has a first substantially planar surface 41 and a second substantially planar surface 42 which is substantially parallel to said first planar surface 41. The gratings 10, 30 and the portions 21a, 21b, 22a, 22b may be on the same planar surface 41, 42, or on opposite surfaces 41, 42. In FIG. 2a, the input grating 10 and the output grating 30 are on the first surface 41 and the portions 21a, 21b are on the second surface 42. The input beam B0 may also be transmitted through the substrate 7 before impinging on the input grating 10.

The micro-display 110 may be e.g. a liquid crystal display, an array of micromechanically movable mirrors, an array of light emitting diodes, or a unit comprising at least one movable light-emitting point. The diagonal dimension of the micro-display may be e.g. smaller than or equal to 25 mm.

Figure 2B:
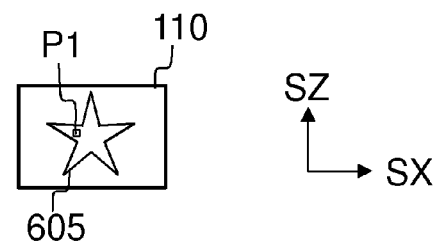
FIG. 2b shows a real image on a micro-display.

FIG. 2b shows a real image 605 formed on the micro display 110. The real image 605 may be formed of light-emitting pixels or light-emitting points P1.

The optical engine 100 may also comprise a light emitting point to provide a light beam and a beam-steering unit to rapidly vary the direction of said beam, wherein optical power provided by said light emitting point may be modulated based on the direction of said beam. The beam-steering unit may comprise e.g. one or more turning reflectors to change the direction of the beam. In other words, the optical engine 100 may also directly provide a virtual image by using a scanning method.

Figure 3A:
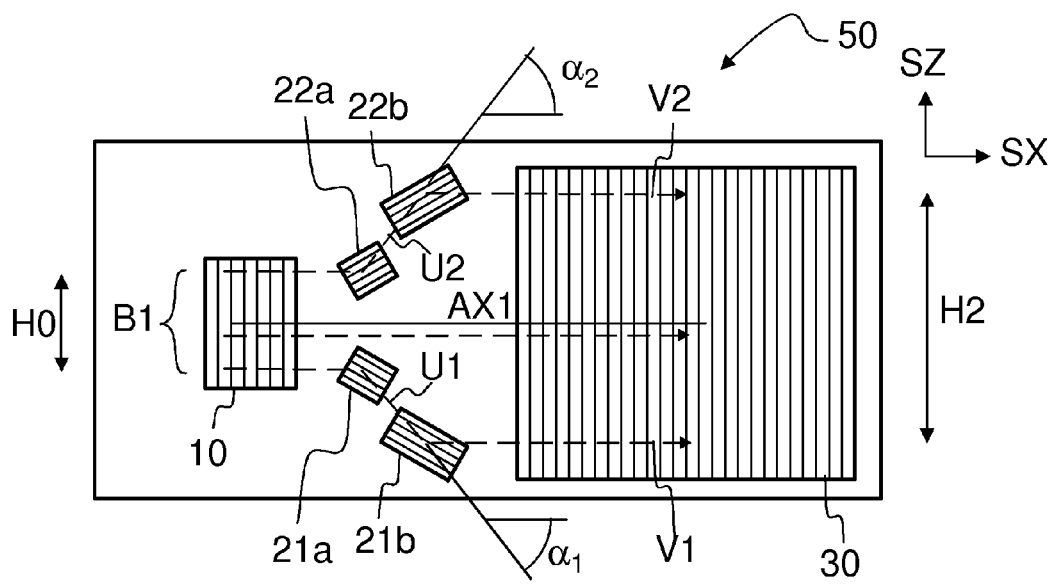
FIG. 3a shows vertical expanding of an in-coupled light beam using deflecting grating portions and direction-restoring grating portions.

Referring to FIG. 3a, a part of the in-coupled beam B1 may be diffracted by the first deflecting portion 21a to provide a first deflected beam U1. A part of the in-coupled beam B1 may be diffracted by the second deflecting portion 22a to provide a second deflected beam U2. The difference between the azimuth angle $\alpha_1$ of said first deflected beam U1 and the azimuth angle $\phi_C$ (shown e.g. FIG. 3b) of said in-coupled beam B1 is negative. The difference between the azimuth angle $\alpha_2$ of said second deflected beam U2 and the azimuth angle $\phi_C$ of said in-coupled beam B1 is positive. The azimuth angle $\alpha_1$ is the angle between the azimuthal direction of said first deflected beam U1 and the direction SX. The azimuth angle $\alpha_2$ is the angle between the azimuthal direction of said second deflected beam U2 and the direction SX. The azimuth angle $\phi_C$ is the angle between the azimuthal direction of said in-coupled beam B1 and the direction SX. The azimuth angles $\phi_C$, $\alpha_1$ and $\alpha_2$ are defined to be smaller than 180 degrees and greater than −180 degrees. A direction vector which has a positive azimuth angle has a component in the direction SZ, and a direction vector which has a negative azimuth angle has a component in a direction opposite the direction SZ.

Figure 3B:
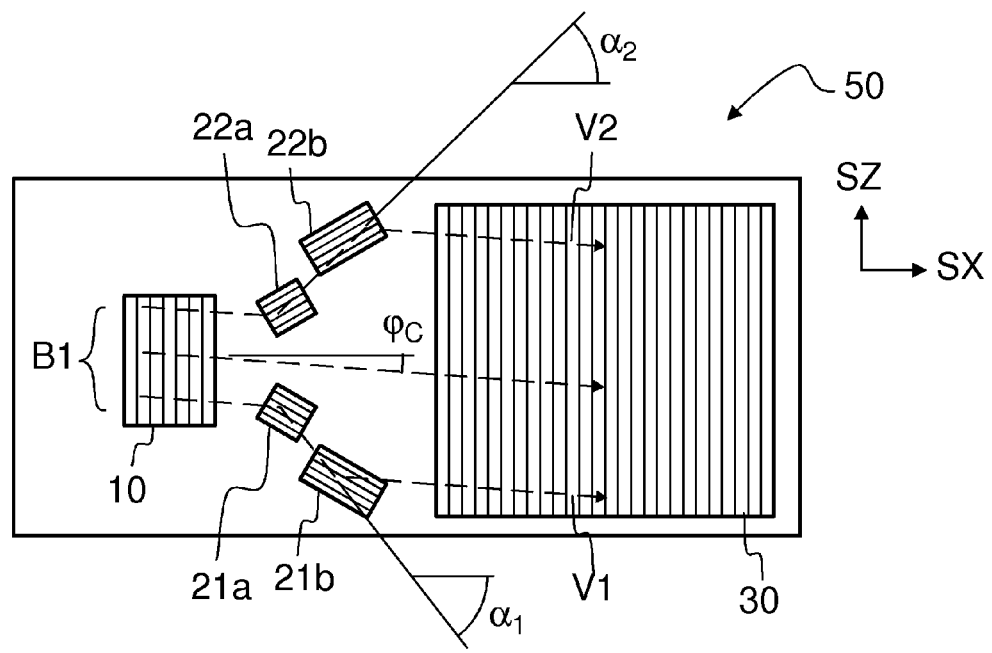
FIG. 3b shows restoring of the direction of the light beam after deflecting.

Referring to FIG. 3b, a part of the first deflected beam U1 is diffracted by the first restoring portion 21b to provide a first restored beam V1. such that the first restored beam V1 has the same azimuth angle $\phi_C$ as the original in-coupled beam B1. The difference between the negative azimuth angle $\alpha_1$ and the azimuth angle $\phi_C$ is negative, and consequently the first restored beam V1 is shifted downwards with respect to the original in-coupled beam B1.

A part of the second deflected beam U2 is diffracted by the second restoring portion 22b to provide a second restored beam V2 such that the second restored beam V2 the same azimuth angle $\phi_C$ as the original in-coupled beam B1. The difference between the positive azimuth angle $\alpha_2$ and the azimuth angle $\phi_C$ is positive, and consequently the second restored beam V2 is shifted upwards, i.e. in the direction SZ with respect to the original in-coupled beam B1.

The restored beams V1 and V2 form together an enlarged beam which has a greater height than the original in-coupled beam B1. Also that part of the in-coupled beam B1 which does not interact with the grating portions may contribute to the enlarged beam.

Figure 4:
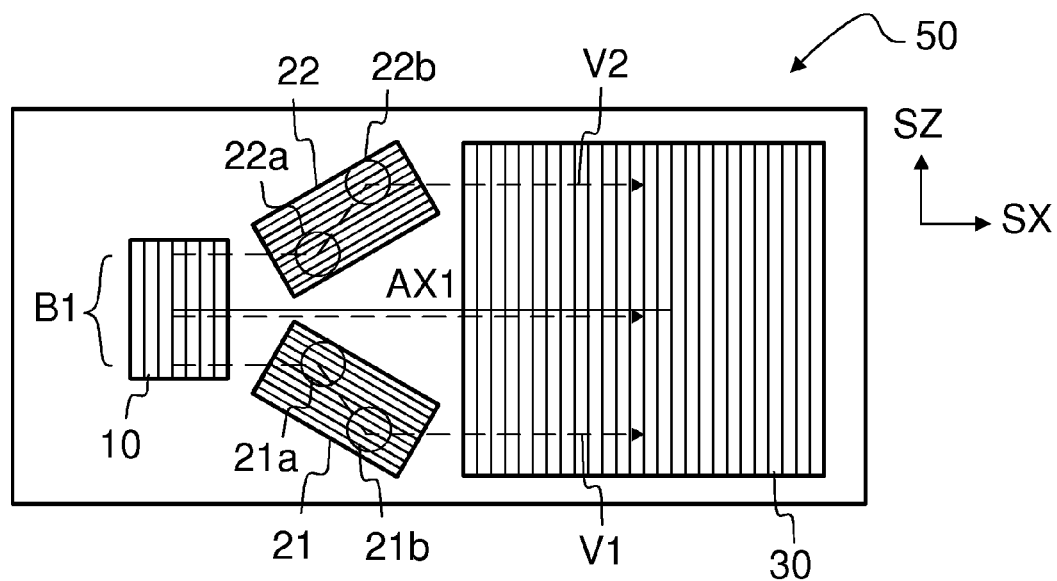
FIG. 4 shows a diffractive beam expander, wherein an intermediate grating comprises a deflecting portion and a direction-restoring portion.

Referring to FIG. 4, a diffractive beam expander 50 may comprise a first intermediate grating 21, which in turn may comprise the first deflecting portion 21a and the first restoring portion 21b. Thus, the first intermediate grating 21 may be adapted to provide a first restored beam V1 which is shifted downwards with respect to the original in-coupled beam B1.

The diffractive beam expander 50 may comprise a second intermediate grating 22 which in turn may comprise the second deflecting portion 22a and the second restoring portion 22b. Thus, the second intermediate grating 22 may be adapted to provide a second restored beam V2 which is shifted upwards with respect to the original in-coupled beam B1.

Light may also be diffracted three or more times by the intermediate grating 21. If light is diffracted an even number of times so that each diffraction changes the azimuthal direction of light, then the final direction may still be substantially the same as the direction of the original in-coupled beam B1

In FIG. 4, the intermediate gratings 21, 22 and the grating portions 21a, 21b, 22a, 22b are symmetrically positioned with respect to the midline AX1.

Figure 5:
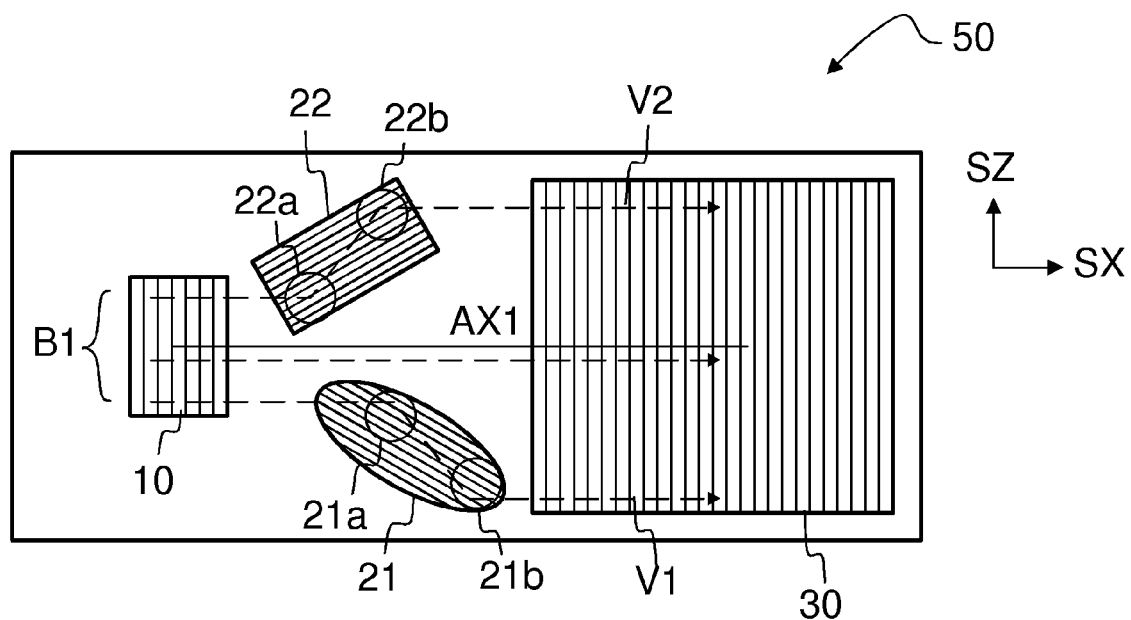
FIG. 5 shows a diffractive beam expander comprising asymmetrically positioned grating portions.

Referring to FIG. 5, the intermediate gratings 21, 22 and the grating portions 21a, 21b, 22a, 22b may also be asymmetrically positioned with respect to the midline AX1.

Figure 6:
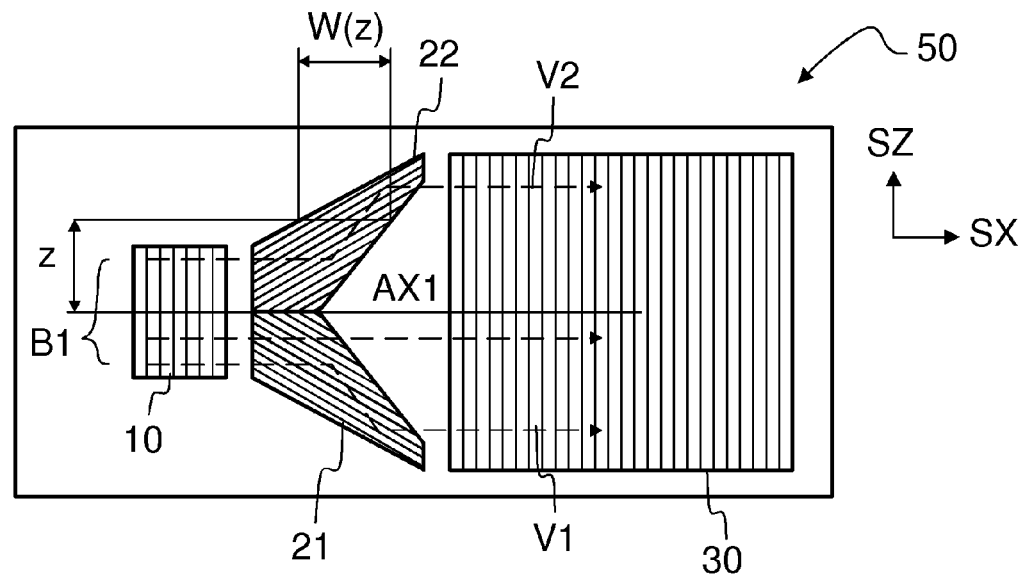
FIG. 6 shows a diffractive beam expander comprising intermediate gratings which together form the shape of a chevron.

Referring to FIG. 6, the first intermediate grating 21 may comprise a first deflecting portion 21a and a first restoring portion 21b. The second intermediate grating 22 may comprise a second deflecting portion 22a and a second restoring portion 22b. The intermediate gratings 21, 22 may together form the shape of a chevron. The gratings 21, 22 may be substantially in contact with each other and with the midline AX1. The local width W(z) of the intermediate gratings may monotonically decrease with an increasing distance z from the midline AX1, when said distance z is greater than half of the height of the input grating 10.

Figure 7:
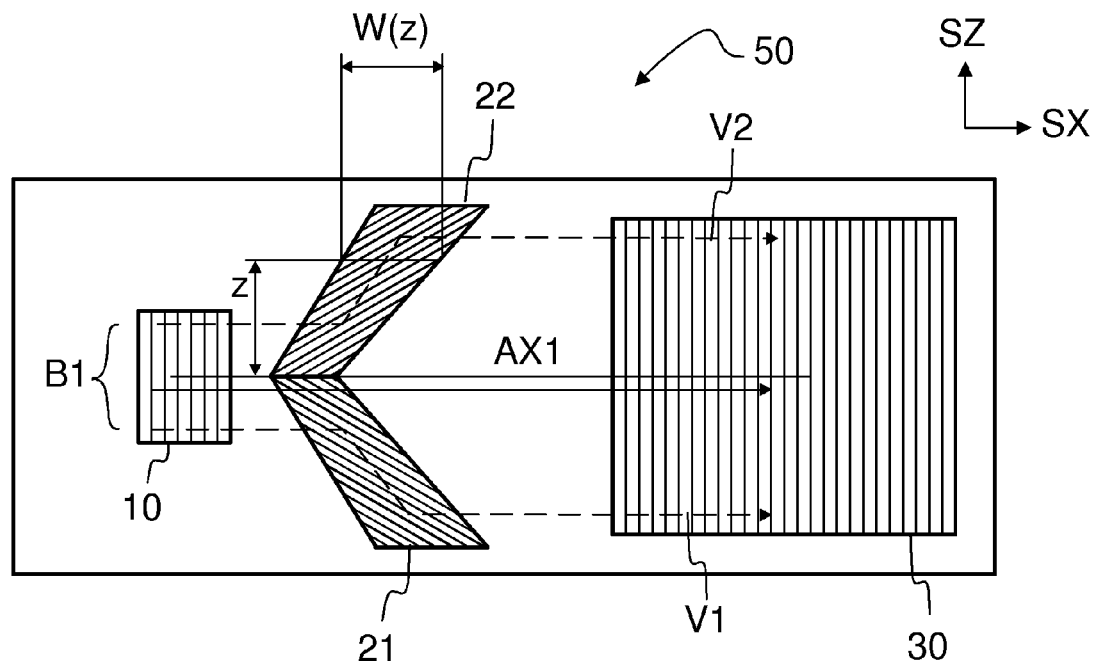
FIG. 7 shows a diffractive beam expander comprising intermediate gratings which together form the shape of a chevron.

Referring to FIG. 7, the local width W(z) of the intermediate gratings may monotonically increase with an increasing distance z from the midline AX1.

Figure 8A:
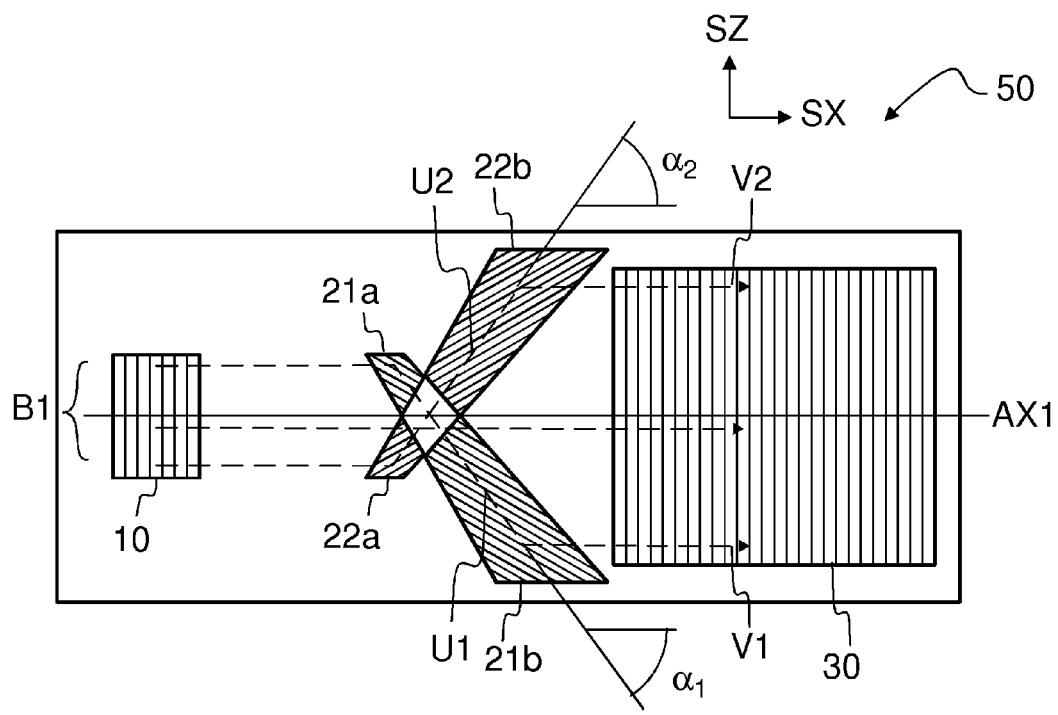
FIG. 8a shows a diffractive beam expander wherein the deflecting portion and the respective direction-restoring portion are on opposite sides of a mid-line.

Referring to FIG. 8a, the first deflecting portion 21a and the corresponding first restoring portion 21b may be on opposite sides of the midline AX1, when viewed from a direction perpendicular to the planes of the waveguiding substrate 7. Consequently, the first deflected beam U1 diffracted by the first deflecting portion 21a crosses the midline AX1 before impinging on the first restoring portion 21b.

Also the second deflecting portion 22a and the corresponding second restoring portion 22b may be on opposite sides of the midline AX1. Consequently, the second deflected beam U2 diffracted by the second deflecting portion 22a crosses the midline AX1 before impinging on the second restoring portion 22b.

The arrangement shown in FIG. 8a guides the light more to the direction where the gaze is. This improves the observed brightness of the image especially at the extreme angles of the field of view than the arrangements in FIG. 7, for example when the zenith angle $\theta_{IN}$ of the input beam B0 is greater than or equal to 5 degrees (FIG. 12c).

Figure 8B:
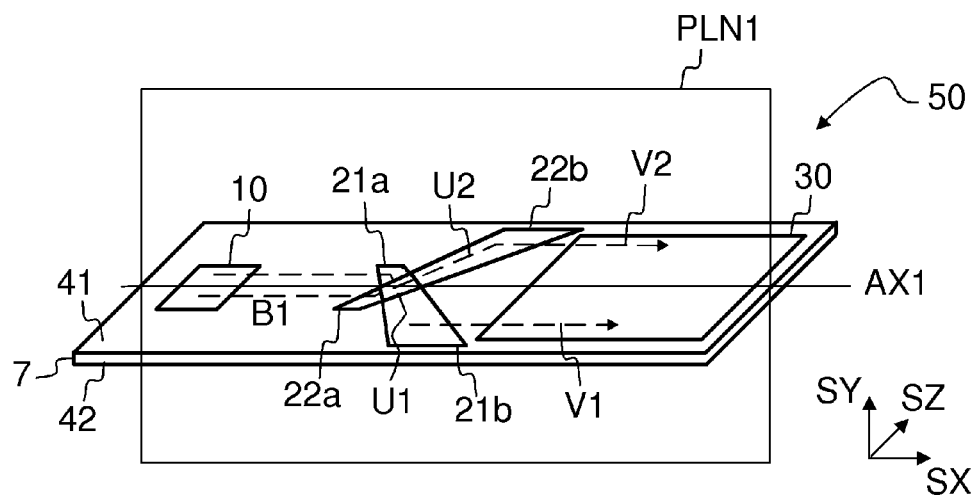
FIG. 8b shows, in a three dimensional view, a plane perpendicular to the plane of the input grating.

FIG. 8b shows a three-dimensional view of the situation of FIG. 8a. A reference plane PLN1 is perpendicular to the plane of the input grating 10 and the planes 41, 42 of the waveguiding substrate 7 of the beam expanding device 50. Thus, the mid-line AX1 represents an intersection of the plane PLN1 with the plane 41 or 42 of the substrate 7. The reference plane PLN1 may be e.g. a plane defined by the directions SX and SY. The portions 21a, 21b, 22a, 22b may be positioned symmetrically or asymmetrically with respect to said plane PLN1.

The first deflection portion 21a and the second restoring portion 22b may be on a first side of the reference plane PLN1. The second deflecting portion 22b and the first restoring portion 21b may be on a second side of said reference plane PLN1. The first deflecting portion 21a is adapted to provide the first deflected beam U1 by diffracting light of the in-coupled beam B1 such that the first deflected beam U1 passes from the first side of the plane PLN1 to the second side of the plane PLN before impinging on the first restoring portion 21b. The second deflecting portion 22a is adapted to provide the second deflected beam U2 by diffracting light of the in-coupled beam B1 such that the second deflected beam U2 passes from the second side of said plane PLN1 to the first side of the plane PLN1 before impinging on the second restoring portion 22b.

The reference plane PLN1 may intersect the input grating 10 and the output grating 30. In particular, the reference plane PLN1 may substantially intersect the centers of the apertures 15, 35 of the gratings 10, 30 (FIG. 1).

Figure 8C:
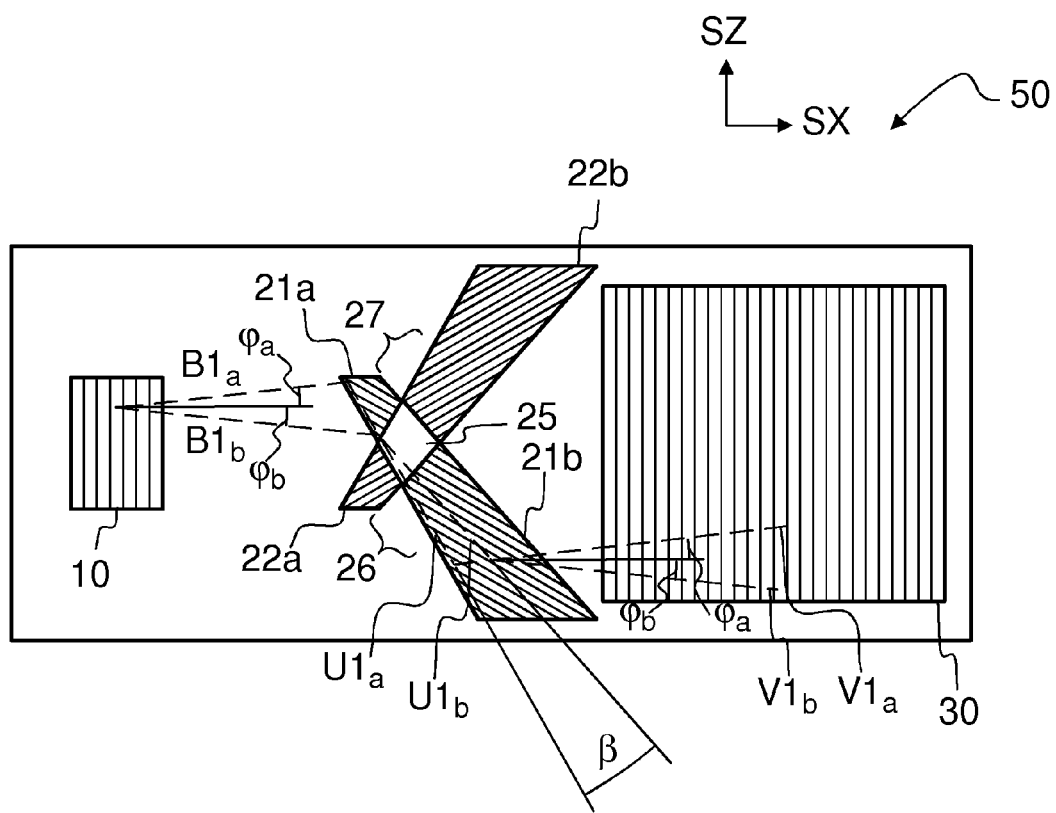
FIG. 8c shows some paths of light rays propagating in the diffractive beam expander of FIG. 8a, FIG. 9 shows a diffractive beam expander comprising auxiliary deflecting portions.

FIG. 8c shows paths of light rays propagating in the diffractive beam expander of FIG. 8a. A first in-coupled light ray B1, corresponds to light emitted from a first pixel which is on a first edge or corner of the micro-display 110 (FIGS. 2a and 2b). A second in-coupled light ray $B1_b$ corresponds to light emitted from a second pixel which is on a second edge or corner of said micro-display 110. The first in-coupled ray $B1_a$ has an azimuth angle $\phi_a$ and the second in-coupled ray $B1_b$ has an azimuth angle $\phi_b$. Said first and second pixels are selected such that the azimuth angles of substantially all in-coupled rays corresponding to the displayed image are smaller than or equal to $\phi_a$ and greater than or equal to $\phi_b$.

Diffraction of the first in-coupled ray $B1_a$ on the first deflecting portion 21a may provide a first deflected ray $U1_a$, and diffraction of the second in-coupled ray $B1_b$ on said first deflecting portion 21a may provide a second deflected ray $U1_b$. β denotes an angle between the first and the second deflected rays $U1_a$, $U1_b$.

Diffraction of the first deflected ray $U1_a$ on the first restoring portion 21b may provide a first restored ray $V1_a$, and diffraction of the second deflected ray $U1_b$ on said first restoring portion 21b may provide a second restored ray $V1_b$. The first restored ray $V1_a$ has the azimuth angle $\phi_a$ and the second restored ray $V1_b$ has the azimuth angle $\phi_b$. In other words, the first restored ray $V1_a$ propagates in the same direction as the first in-coupled ray $B1_a$, and the second restored ray $V1_b$ propagates in the same direction as the second in-coupled ray $B1_b$.

The forms and the positions of the first deflecting portion 21a, of the second deflecting portion 22a, of the first restoring portion 21b and of the second deflecting portion 22b may be selected such that light rays deflected from the first deflecting portion 21a do not impinge on the second deflecting portion 22a, and such that light rays deflected from the first deflecting portion 21a do not impinge on the second restoring portion 22b, and such that that light rays deflected from the second deflecting portion 22a do not impinge on the first deflecting portion 21a, and such that light rays deflected from the second deflecting portion 22a do not impinge on the first restoring portion 21b, wherein said light rays correspond to extreme points on the image area of said micro-display 110.

For example, diffractive beam expanders 50 shown in FIGS. 3a to 10c, may fulfil the above-mentioned condition. The extreme azimuth angles $\phi_a$ and $\phi_b$ may be selected by choosing the dimensions of the micro-display 110 and the focal length of the imaging optics 120.

The diffractive beam expander 50 may comprise substantially non-diffracting portions 26, 27 and/or a substantially non-diffraction portion 25 in order to fulfil the above-mentioned condition.

In addition, the portions 21a, 21b, 22a, 22b may be arranged e.g. in a crossed wedge formation shown e.g. in FIGS. 8a and 8c in order to fulfil the above-mentioned condition. The sides of the wedges may be substantially aligned with the directions of the deflected light rays. For example, a first side of the portion 21a and a first side of the portion 21b may be aligned with the first deflected ray $U1_a$, and a second side of the portion 21a and a second side of the portion 21b may be aligned with the second deflected ray $U1_b$.

In addition, a side of the portion 22a may be substantially aligned with the deflected light ray $U1_a$, and a side of the portion 22b may be substantially parallel to the deflected light ray $U1_b$.

A single pixel P1 of the micro-display 110 provides a plurality of in-coupled rays which propagate in the same direction defined by a single azimuth angle, said rays constituting an in-coupled beam B1. The beam expanding device 50 provides an output beam B2 for each pixel of the micro-display 110. The plurality of the output beams B2 provide for the viewer E1 an impression of a virtual image.

Figure 9:
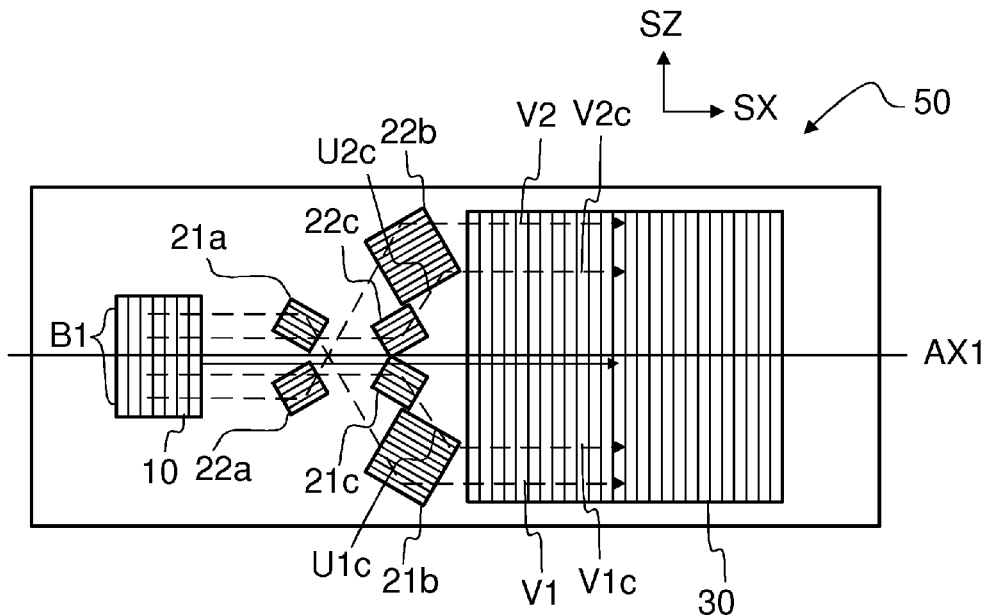

Referring to FIG. 9, the diffractive beam expander 50 may comprise auxiliary deflecting portions 21c, 22c to provide further deflected beams U1c, U2c. The further deflected beams U1c, U2c may impinge on the restoring portions 21b, 22b to provide further restored beams V1c, V2c such that the further restored beams V1c, V2c together with the beams V1, V2 propagate in the same direction as the original in-coupled beam B1. The further deflected beams U1c, U2c may impinge on the restoring portions 21b, 22b without crossing the midline AX1, i.e. without passing through the plane PLN1.

The arrangement of FIG. 9 provides better uniformity of the observed brightness and a higher throughput efficiency at extreme angles of the field of view than the arrangement of FIG. 8, i.e. when the observer is gazing upper or lower edges of the field of view. In other words, a difference between the intensity of the output beam B2 at zenith angle $\theta_{OUT}$=5 degrees and the intensity of the output beam B2 at zenith angle $\theta_{OUT}$=0 degrees may be smaller for the device of FIG. 9 than for the device of FIG. 8a.

Figure 10A:
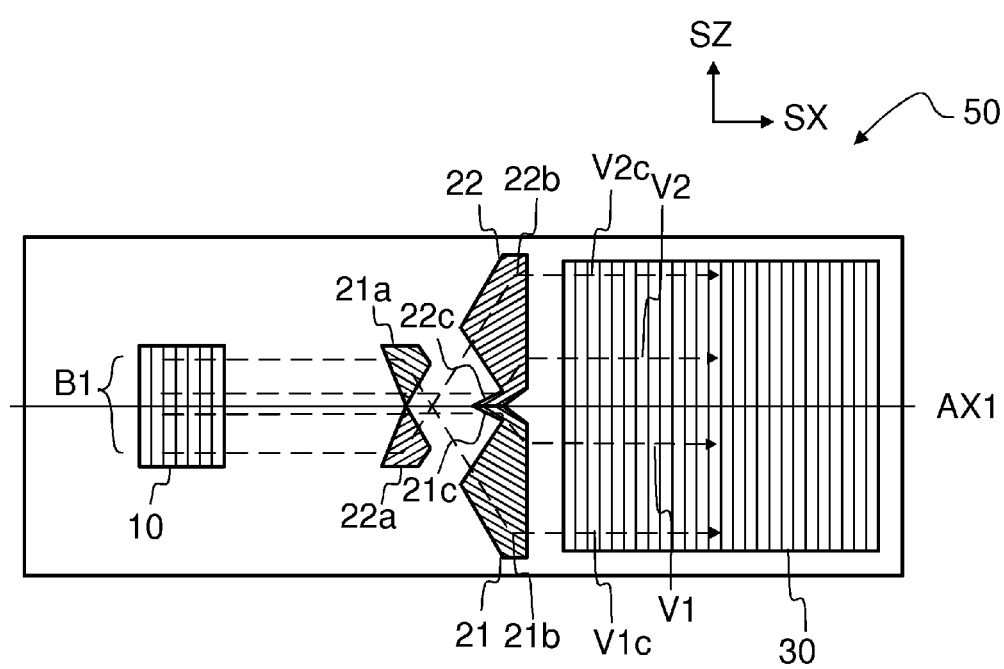
FIG. 10a shows a diffractive beam expander comprising auxiliary deflecting portions.

Referring to FIG. 10a, a first auxiliary deflecting portion 21c and the first restoring portion 21b may be portions of a first intermediate grating 21, which is located on the lower side of the midline AX1, i.e. on the second side of the reference plane PLN1). A second auxiliary deflecting portion 22c and the second restoring portion 22b may be portions of a second intermediate grating 22, which is located on the upper side of the midline AX1, i.e. on the first side of the reference plane PLN1. The first deflecting portion 21a may be located on the upper side of the midline AX1 and on the first side of the reference plane PLN1. The deflecting portions 21a, 21c may provide deflected beams which impinge on the first restoring portion 21b.

The form of the first deflecting portion 21a may be substantially a polygon defined by the height of the in-coupling grating 10 and the directions of light propagating inside the substrate so that none of the light rays deflected from the deflecting portion 21a impinge on the second intermediate grating 22 and so that none of the light rays deflected from the deflecting portion 22a impinge on the first intermediate grating 21. The form of the first intermediate grating 21 may be substantially a polygon fulfilling a condition that none of the light rays deflected from the deflecting portion 22a impinge on said intermediate grating 21.

The second deflecting portion 22a may be substantially a mirror image of the first deflecting portion 21a with respect to the midline AX1. The second intermediate grating 22 may be substantially a mirror image of the first intermediate grating 21 with respect to the midline AX1.

The arrangement of FIG. 10a provides a high throughput efficiency and a quite uniform intensity distribution over the field of view.

Figure 10B:
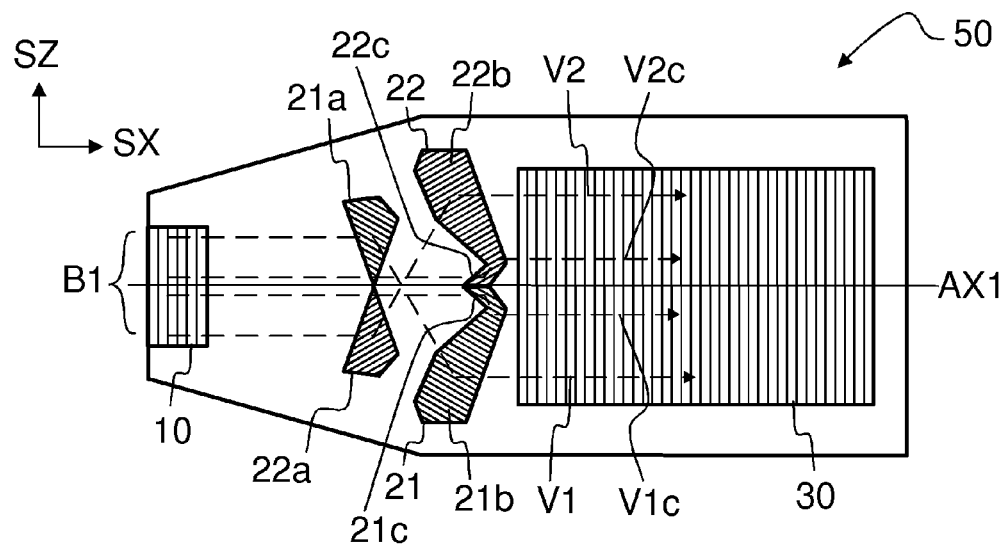
FIG. 10b shows a diffractive beam expander comprising auxiliary deflecting portions.

Referring to FIG. 10b, the form and the position of the deflecting portions 21a, 22a, 21c, 22c and the restoring portions 21b, 22b may be further selected to reduce beam divergence caused by aperture-related diffraction, when compared with the device of FIG. 10a. Larger dimensions of the auxiliary deflecting portions 21c, 22c provide less diverging beams than in case of FIG. 10a.

For example, the coordinates of the corner points of the in-coupling grating 10 may be (0.00, 3.50), (3.50, 3.50), (3.50, −3.50), and (0.00, −3.50). The first coordinate represents a position in the direction SX and the second coordinate represents a position in the direction SZ. The corner points of the first deflecting portion 21a may be (13.40, 0.00), (11.61, 5.08), (13.72, 5.37), and (14.84, 4.09). The corner points of the first intermediate grating 21, may be (15.79, −6.80), (16.22, −8.00), (18.86, −8.00), (21.22, −1.40), (20.22, 0.00), (18.62, 0.00), (20.13, −1.30), and (17.00, −4.00). The corner points of the output grating 30 may be (22.00, 7.00), (43.00, 7.00), (43.00, −7.00), and (22.00, −7.00).

Figure 10C:
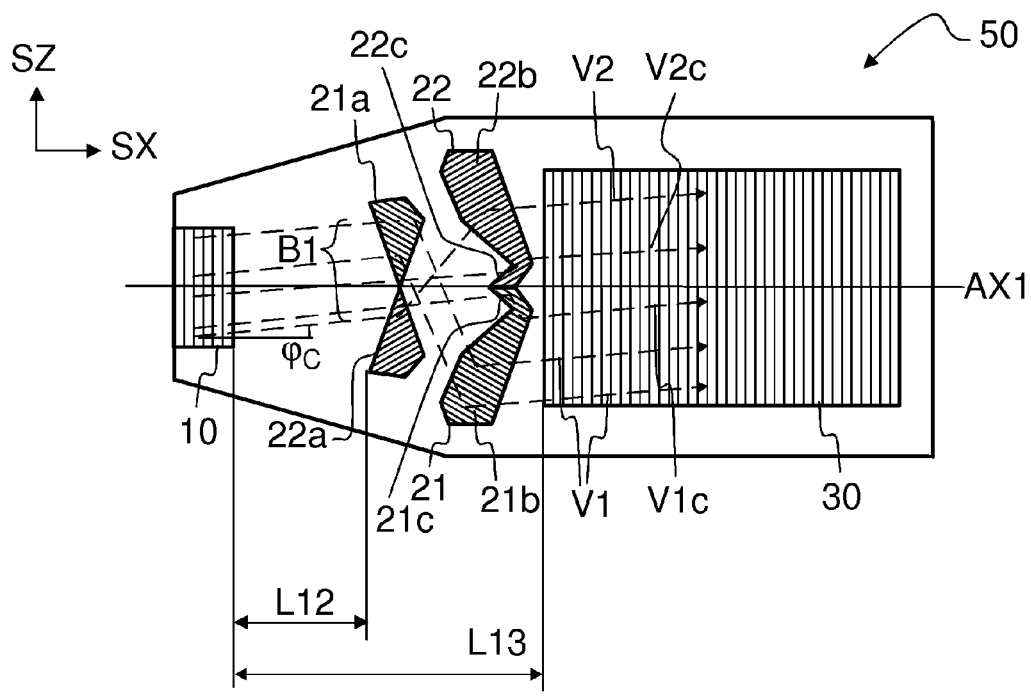
FIG. 10c shows shifting of the in-coupled beam with respect to the deflecting portions.

Referring to FIG. 10c, the in-coupled beam B1 may be adapted to shift in the direction SZ with respect to the deflecting portions 21a, 21b according to the azimuth angle $\phi_C$ of said in-coupled beam B1. The height of a first part of the in-coupled beam B1 impinging on the first deflecting portion 21a may be greater than the height of a second part of said in-coupled beam B1 impinging on the second deflecting portion 22a when the azimuth angle $\phi_C$ is greater than zero, and the height of said first part of the in-coupled beam B1 impinging on the first deflecting portion 21a may be smaller than the height of the second part of said in-coupled beam B1 impinging on the second deflecting portion 22a when the azimuth angle $\phi_C$ is smaller than zero. Said heights are defined in the direction SZ.

The relationship between said shifting and the azimuth angle $\phi_C$ depends on the distance L12 between the input grating 10 and the deflecting portions 21a, 22a. The distance L12 may be e.g. greater than 0.3 times a distance L13 between the input grating 10 and the output grating 30. The distance L12 may be even greater than or equal to 0.5 times the distance L13. When defined in an alternative way, the distance L12 may be e.g. greater than or equal to the height H0 (FIG. 1) of the input beam B0. The area between the input grating 10 and the deflecting portions 21a, 22a may be substantially non-diffracting.

Figure 10D:
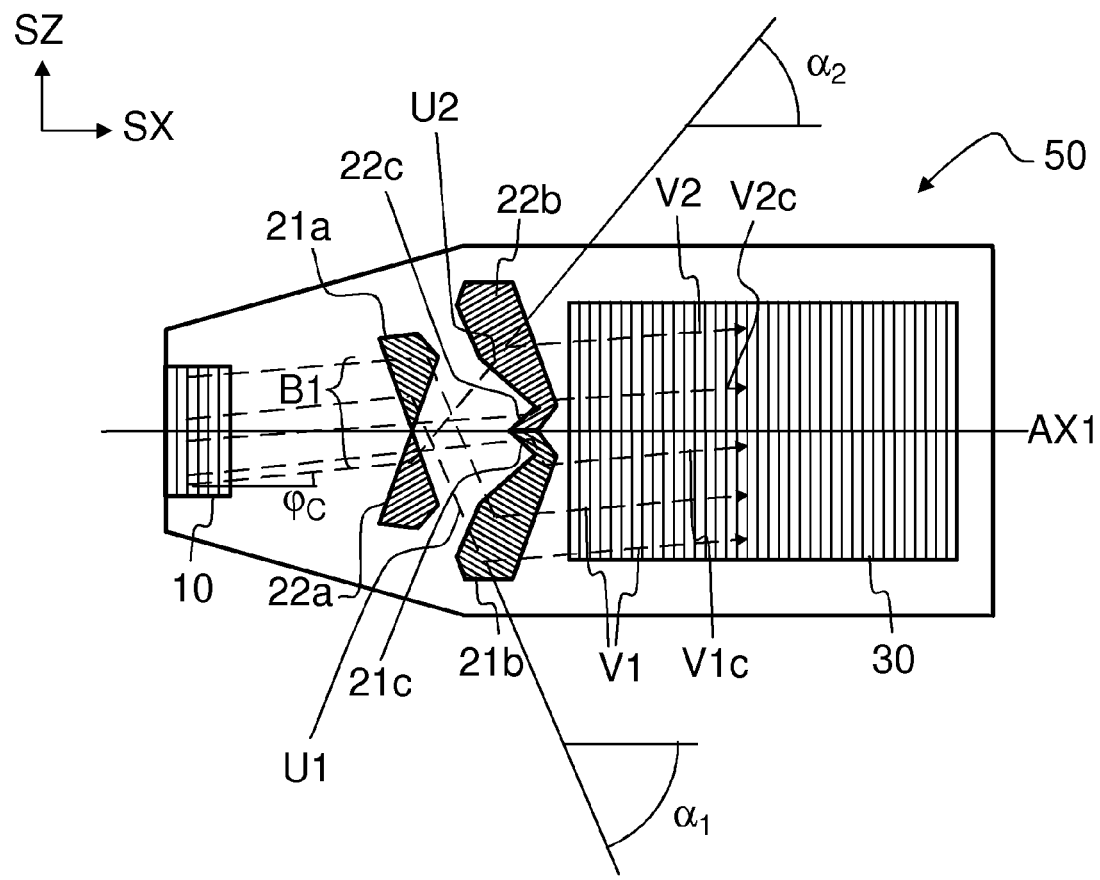
FIG. 10d shows azimuth angles of deflected beams in the situation of FIG. 10c.

Referring to FIG. 10d, the deflecting portions 21a, 21c, 22a, and 22c provide deflected beams U1, U2, and the restoring portions 21b, 22b provide restored beams V1, V1c, V2, V2c having the same azimuth angle $\phi_C$ as the in-coupled beam B1. The difference between the azimuth angle $\alpha_1$ of the first deflected beam U1 and the azimuth angle $\phi_C$ of the in-coupled beam B1 is negative. The difference between the azimuth angle $\alpha_2$ of the second deflected beam U1 and the azimuth angle $\phi_C$ of the in-coupled beam B1 is positive. The portions 21a, 22b, 22c are on a first side of the mid-line AX1 and on the first side of the reference plane PLN1. The portions 22a, 21b, 21c are on a second side of the mid-line AX1 and on the second side of the reference plane PLN1.

Figure 11A:
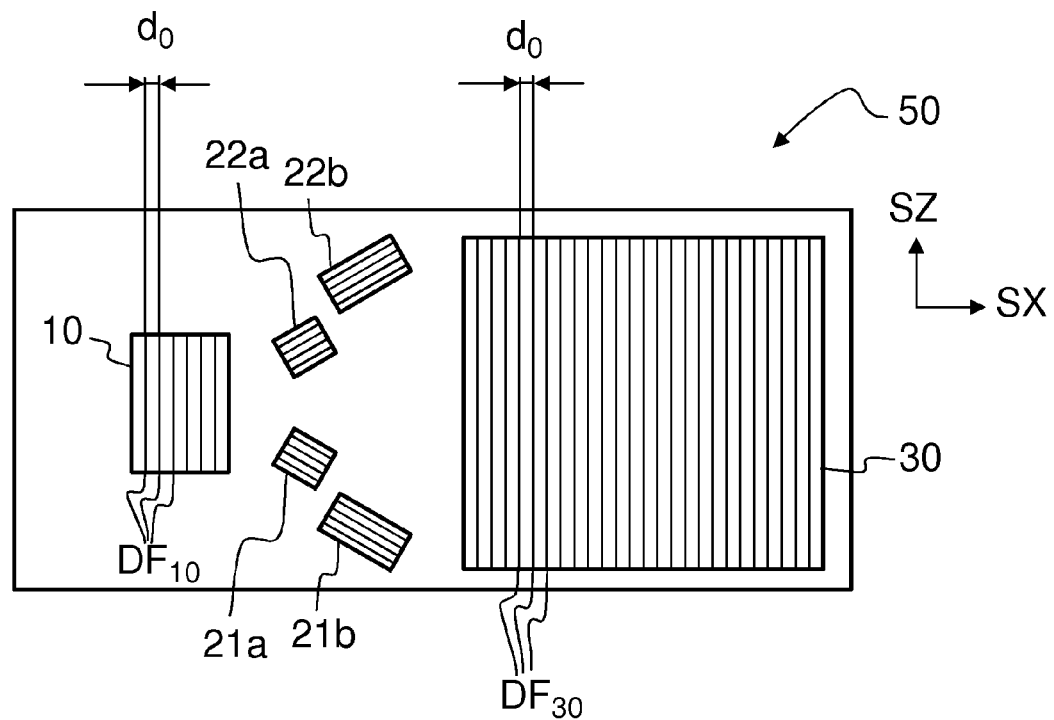
FIG. 11a shows the grating period of the gratings and the orientation of the diffractive features.

Referring to FIG. 11a, the input grating 10 comprises a plurality of substantially linear diffractive features $DF_{10}$, which have a grating period $d_0$. The output grating 30 comprises a plurality of substantially linear diffractive features $DF_{30}$. The grating period of the output grating 30 may also be substantially equal to $d_0$. The diffractive features $DF_{10}$ and $DF_{30}$ may be e.g. adjacent grooves or ridges.

The grating period $d_0$ of the input grating 10 may be selected to provide only four diffraction orders, namely the reflective diffraction orders 1 and −1 and the transmissive diffraction orders 1 and −1, which may reflectively and/or transmissively couple light into the substrate 7. The input grating 10 may also diffract light in the transmissive diffraction order 0 which corresponds to direct transmission through the grating and/or in the reflective diffraction order 0 which corresponds to direct reflection from the grating. If the input grating 10 has a slanted profile, then it may be adapted to provide substantially one first order diffraction, namely 1 or −1.

The diffractive features $DF_{10}$ may be substantially parallel to the diffractive features $DF_{30}$. The diffractive features $DF_{10}$ and $DF_{30}$ may be substantially parallel to the direction SZ and perpendicular to the midline AX1.

Figure 11B:
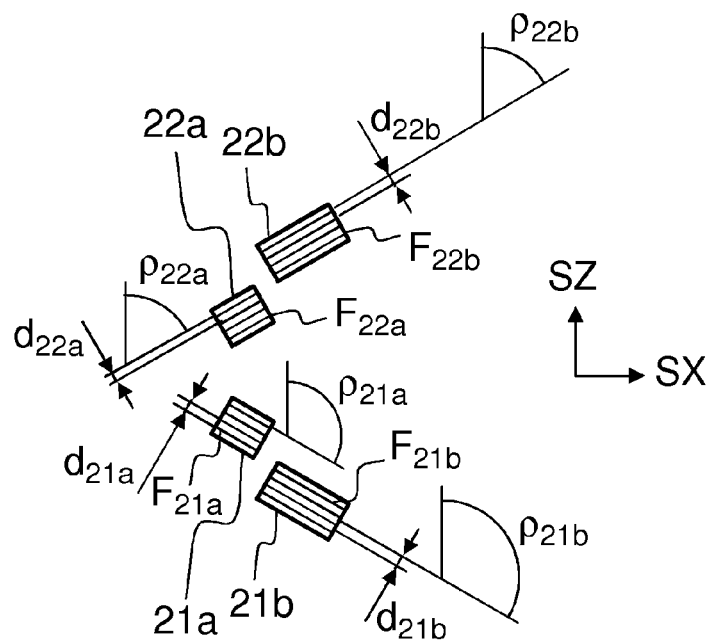
FIG. 11b shows the grating period of the grating portions according to FIG. 11a, and the orientation of the diffractive features of said portions.

Referring to FIG. 11b, the first deflecting grating portion 21a has a plurality of diffractive features $F_{21a}$, which have an angle $\rho_{21a}$ with respect to the direction SZ. The first deflecting grating portion 21a has a grating period $d_{21a}$.

The second deflecting grating portion 22a has a plurality of diffractive features $F_{22a}$, which have an angle $\rho_{22a}$ with respect to the direction SZ. The second deflecting grating portion 22a has a grating period $d_{22a}$.

The first restoring grating portion 21b has a plurality of diffractive features $F_{21b}$, which have an angle $\rho_{21b}$ with respect to the direction SZ. The first restoring grating portion 21b has a grating period $d_{21b}$.

The second restoring grating portion 22b has a plurality of diffractive features $F_{22b}$, which have an angle $\rho_{22b}$ with respect to the direction SZ. The second restoring grating portion 22b has a grating period $d_{22b}$.

The relationship between the orientation angle $\rho$ of the diffractive features and the grating period of said features is given by $$d = \frac{d_0}{A_0 \cos \rho} \quad (1)$$

Where $d_0$ is the grating period of the input grating 10, and $A_0$ is a constant having a value in the range of 1.8 to 2.2. In particular, the constant $A_0$ may be substantially equal to two. The grating periods of the grating portions 21a, 21b, 22a, 22b, 21c, 22c may now be solved using eq. (1).

The grating periods of the grating portions 21a, 21b, 22a, 22b, 21c, 22c may be selected using eq. (1) such that diffraction is allowed only in the zeroth and in the first diffraction modes. The sign of the first order diffraction depends on the chosen coordinates.

The angle $\rho_{21a}$ between the direction of the diffractive features $F_{21a}$ of said first deflecting grating portion 21a and the direction SZ of the diffractive features $DF_{11}$ of said input grating 10 may be in the range of 55 to 65 degrees. In particular, the orientation angle $\rho_{21a}$ may be substantially equal to 60 degrees. The orientation angle $\rho_{22a}$ may be substantially equal to 120 degrees, respectively.

The first deflecting portion 21a and the first restoring portion 21b may have the same orientation of diffractive features and the same grating period. The second deflecting portion 22a and the second restoring portion 22b may have the same orientation of diffractive features and the same grating period. The first auxiliary reflecting portion 21c (not shown in FIGS. 11a and 11b) and the first restoring portion 21b may have the same orientation of diffractive features and the same grating period. The second auxiliary reflecting portion 22c (not shown in FIGS. 11a and 11b) and the second restoring portion 22b may have the same orientation of diffractive features and the same grating period.

Figure 12A:
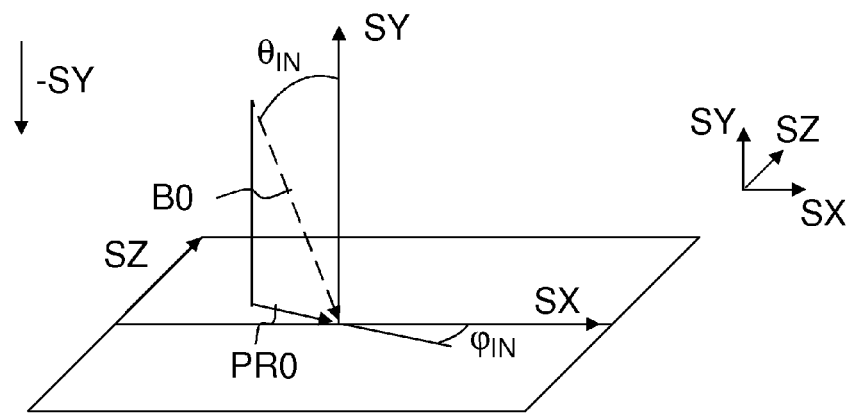
FIG. 12a shows, in a three dimensional view, azimuth and zenith angles of an input beam.

FIG. 12a shows the azimuth angle $\phi_{IN}$ of the input beam B0 and the zenith angle $\theta_{IN}$ of the input beam B0. The zenith angle $\theta_{IN}$ is an angle between the direction of the beam B0 and the direction −SY. The direction −SY is opposite the direction SY. The surface normal of the input grating 10 is parallel to the direction SY.

The azimuth angle $\phi_{IN}$ is an angle between the projection PR0 and the direction SX, wherein said projection PR0 is the projection of the direction of the input beam B0 in a plane defined by the directions SX and SZ. The projection PR0 is the left side of the azimuth angle.

Figure 12B:
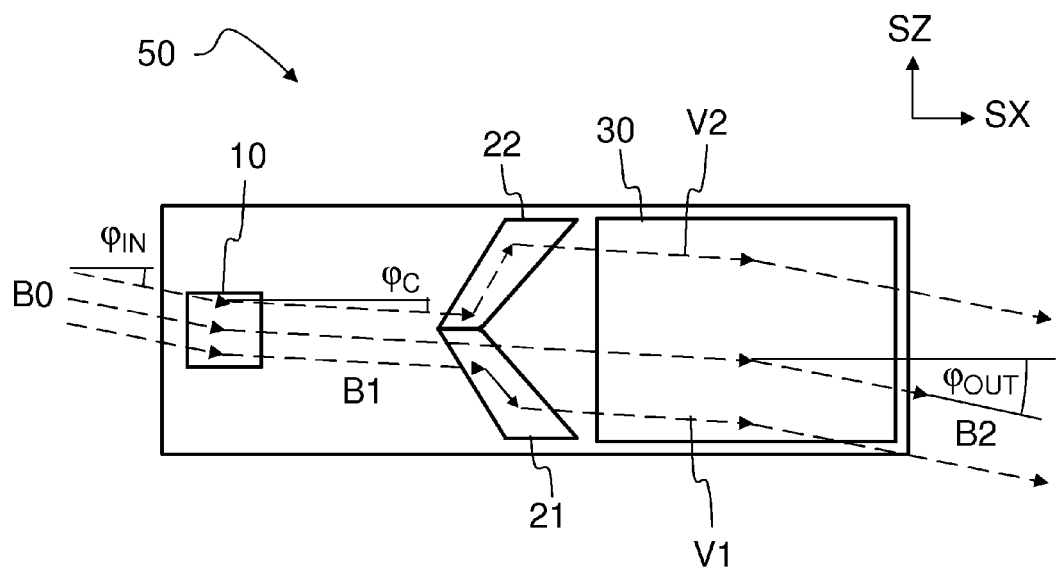
FIG. 12b shows the azimuth angle of the input beam, the azimuth angle of the in-coupled beam, and the azimuth angle of the output beam.
Figure 12C:
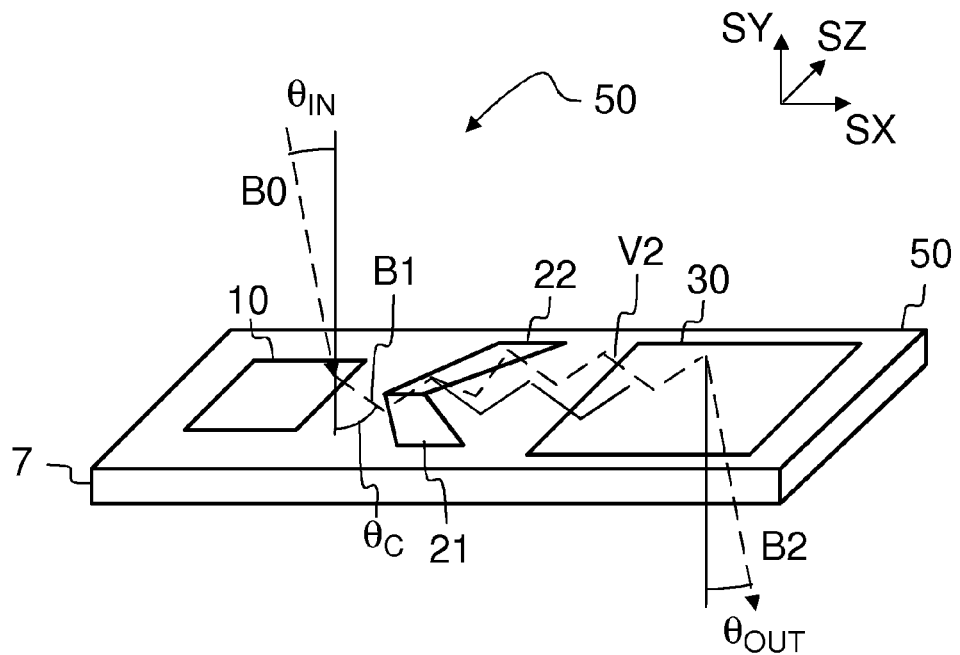
FIG. 12c shows, in a three dimensional view, the zenith angle of the input beam and the zenith angle of the output beam.

Referring to FIG. 12b, the projection of the input beam B0 on the SX-SZ-plane has the azimuth angle $\phi_{IN}$ with respect to the direction SX. The projections of the in-coupled beam B1 and the restored beams V1, V2 have an azimuth angle $\phi_c$ with respect to the direction SX. The projection of the output beam B2 has an azimuth angle $\phi_{OUT}$ with respect to the direction SX.

Referring to FIG. 12c, the direction of the input beam B0 has a zenith angle $\theta_{IN}$ with respect to the direction −SY. The direction of the in-coupled beam B1 has a zenith angle $\theta_C$ with respect to the direction SY. The direction of the output beam B2 has a zenith angle $\theta_{OUT}$ with respect to the direction −SY.

Figure 13:
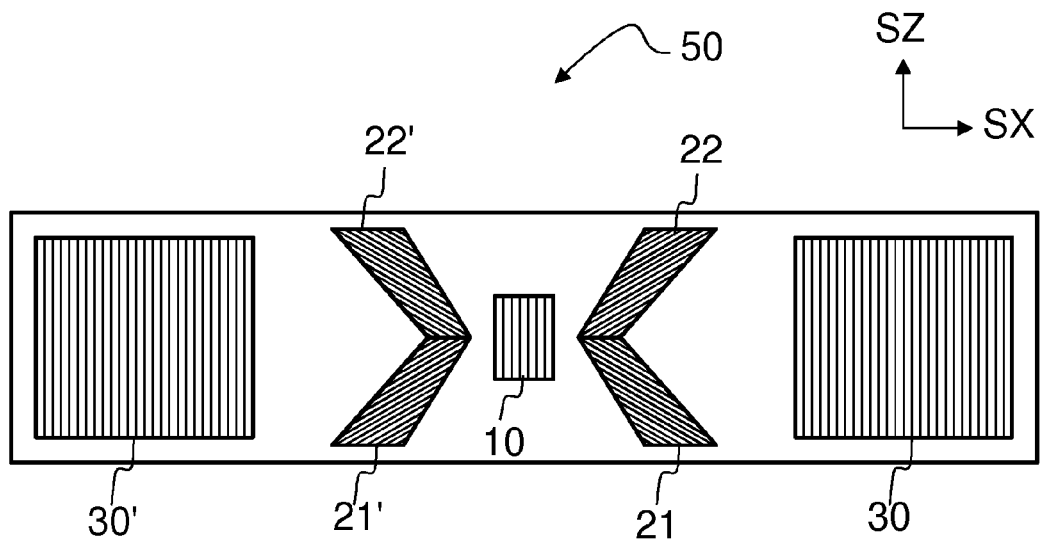
FIG. 13 shows a bi-ocular diffractive beam expander.

Referring to FIG. 13, the diffractive beam expander 50 may also be bi-ocular. The input grating 10 may be adapted to diffract light towards a first set of intermediate gratings 21, 22 and also towards a second set of intermediate gratings 21', 22'. The expander 50 may have a first output grating 30 to provide a beam B2 for a right eye of an observer, and a second output grating 30' to provide a second beam B2 for a left eye of an observer.

The diffractive beam expander 50 may be used to implement a virtual display device 200 shown in FIG. 14. The output beams B2 provided by the output gratings 30, 30' to the eyes E1, E2 of a viewer provide for the viewer an impression of a virtual image 710 displayed at an infinite distance from the viewer. The virtual image 710 may be e.g. a star pattern as shown in FIG. 14, corresponding to a real image 605 generated by the micro-display 110 (FIG. 2b). The virtual image 710 may be e.g. graphics and/or text.

The display device of FIG. 14 may further comprise earpieces 260 which may be positioned on the ears of the viewer in order to facilitate positioning of the diffractive beam expander 50 in front of the viewer. The display device 200 may also be attached to a headgear, e.g. to a helmet.

A bi-ocular display device 200 may comprise two separate optical engines 100 and two separate mono-ocular beam expanders 50 in order to show stereoscopic virtual images. The diffractive beam expander 50 may be partially transparent, allowing the user to see his environment through the viewing aperture 35 of the expander 50 while also viewing a displayed virtual image 710. This transparent arrangement may be applied e.g. in augmented reality systems.

Figure 15:
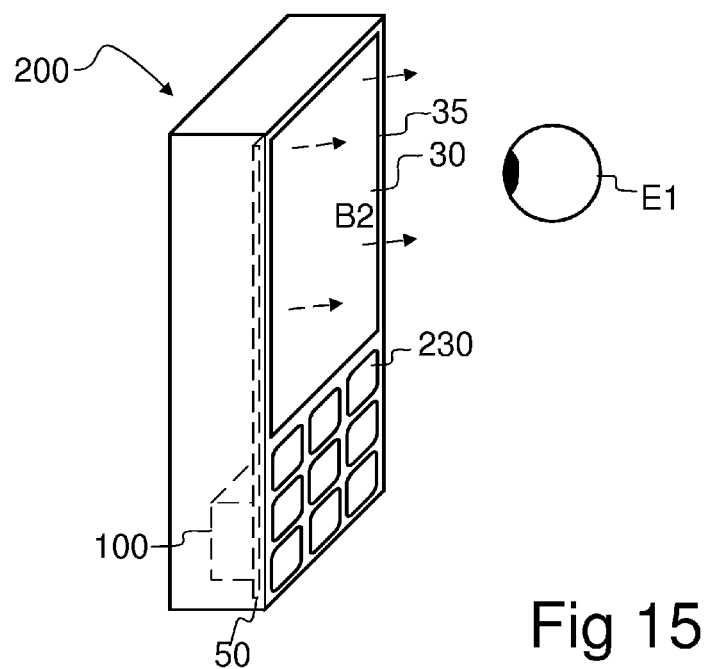
FIG. 15 shows, in a three dimensional view, a display device for showing virtual images.

FIG. 15 shows a device 200 comprising a mono-ocular virtual display implemented by using the diffractive beam expander 50. The device 200 may further comprise e.g. a key set 230 for controlling said device. The device 200 of FIG. 14 or 15 may further comprise e.g. a data processing unit, memory and communications unit to provide access to a mobile telephone network, internet or local area network. The device 200 may be, for example, selected from the following list: a display module connectable to a further device, portable device, device with wireless telecommunicating capabilities, imaging device, mobile phone, gaming device, music recording/playing device (based on e.g. MP3-format), remote control transmitter or receiver, navigation instrument, measuring instrument, target finding device, aiming device, navigation device, personal digital assistant (PDA), communicator, portable internet appliance, hand-held computer, accessory to a mobile phone.

Showing of virtual images at distances shorter than infinity may be implemented using a diffractive beam expander 50 comprising non-planar output grating having a finite curvature radius, as disclosed e.g. in a patent application PCT/IB2004/004094.

For the person skilled in the art, it will be clear that modifications and variations of the devices and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A device comprising:
a substantially planar waveguiding substrate;
an input grating to provide an in-coupled beam propagating within said substrate by diffracting light of an input beam into said substrate;
a first deflecting grating portion to provide a first deflected beam by diffracting a part of said in-coupled beam such that the difference between the azimuth angle of said first deflected beam and the azimuth angle of said in-coupled beam is negative, said first deflecting grating portion comprising substantially linear diffractive features;
a second deflecting grating portion to provide a second deflected beam by diffracting a part of said in-coupled beam such that the difference between the azimuth angle of said second deflected beam and the azimuth angle of said in-coupled beam is positive, said second deflecting grating portion comprising substantially linear diffractive features, the diffractive features of said second deflecting grating portion having a different orientation than the diffractive features of said first deflecting grating portion;
a first restoring grating portion to provide a first restored beam by diffracting light of said first deflected beam;
a second restoring grating portion to provide a second restored beam, said second restored beam being substantially parallel to said first restored beam; and
an output grating,
wherein a part of the in-coupled beam propagates within the substrate without being diffracted by said first deflecting grating portion, said second deflecting grating portion, said first restoring grating portion and said second restoring grating portion to provide a non-diffracted beam, and
said output grating to provide an out-coupled beam by diffracting light of said first restored beam, said non-diffracted beam and said second restored beam out of said substrate, said out-coupled beam being substantially parallel to said input beam.

2. The device of claim 1 wherein said first deflecting grating portion and said second restoring grating portion are on a first side of a reference plane, and said second deflecting grating portion and said first restoring grating portion are on a second side of said reference plane, said reference plane being substantially perpendicular to the plane of said input grating.

3. The device according to claim 1, wherein said in-coupled beam is adapted to shift with respect to said deflecting portions according to the direction of said in-coupled beam.

4. The device according to claim 1 wherein said first restored beam and said second restored beam are substantially parallel to the direction of said in-coupled beam, and the output grating is further adapted to diffract a part of said in-coupled beam out of said substrate.

5. The device according to claim 1 wherein an angle between the direction of the diffractive features of said first deflecting grating portion and the direction of the diffractive features of said input grating is in the range of 55 to 65 degrees.

6. A method for expanding a light beam comprising:
diffracting light of an input beam into a substantially planar waveguiding substrate in order to provide an in-coupled beam propagating within said substrate;
providing a first deflected beam by diffracting a part of said in-coupled beam by using a first deflecting grating portion such that the difference between the azimuth angle of said first deflected beam and the azimuth angle of said in-coupled beam is negative;
providing a second deflected beam by diffracting a part of said in-coupled beam by using a second deflecting grating portion such that the difference between the azimuth angle of said second deflected beam and the azimuth angle of said in-coupled beam is positive;
providing a first restored beam by diffracting a part of said first deflected beam by using a first restoring grating portion;
providing a second restored beam by diffracting a part of said second deflected beam by using a second restoring grating portion, said second restored beam being substantially parallel to said first restored beam;
providing a non-diffracted beam by guiding a part of said in-coupled beam within the substrate without being diffracted by said first deflecting grating portion, said second deflecting grating portion, said first restoring grating portion and said second restoring grating portion to provide a non-diffracted beam; and
coupling light of said first restored beam, said non-diffracted beam and said second restored beam out of said substrate to provide an output beam, said output beam being substantially parallel to said input beam;
wherein said first deflecting grating portion comprises substantially linear diffractive features, and said second deflecting grating portion comprising substantially linear diffractive features, the diffractive features of said second deflecting grating portion having a different orientation than the diffractive features of said first deflecting grating portion.

7. The method according to claim 6, wherein said first deflecting grating portion and said second restoring grating portion are on a first side of a reference plane, and said second deflecting grating portion and said first restoring grating portion are on a second side of reference plane, said reference plane being substantially perpendicular to the plane of an input grating.

8. A device comprising an optical engine to provide at least one light beam, and a diffractive beam expander to expand said at least one light beam such that a virtual image is observable through a viewing aperture of said diffractive beam expander, said diffractive beam expander in turn comprising:
- a substantially planar waveguiding substrate;
- an input grating to provide an in-coupled beam propagating within said substrate by diffracting light of an input beam into said substrate;
- a first deflecting grating portion to provide a first deflected beam by diffracting a part of said in-coupled beam such that the difference between the azimuth angle of said first deflected beam and the azimuth angle of said in-coupled beam is negative, said first deflecting grating portion comprising substantially linear diffractive features;
- a second deflecting grating portion to provide a second deflected beam by diffracting a part of said in-coupled beam such that the difference between the azimuth angle of said second deflected beam and the azimuth angle of said in-coupled beam is positive, said second deflecting grating portion comprising substantially linear diffractive features, the diffractive features of said second deflecting grating portion having a different orientation than the diffractive features of said first deflecting grating portion;
- a first restoring grating portion to provide a first restored beam by diffracting light of said first deflected beam;
- a second restoring grating portion to provide a second restored beam, said second restored beam being substantially parallel to said first restored beam;
- wherein a non-diffracted beam is provided by guiding a part of said in-coupled beam within the substrate without being diffracted by said first deflecting grating portion, said second deflecting rain portion, said first restoring grating portion and said second restoring grating portion to provide a non-diffracted beam; and
- an output grating to provide an out-coupled beam by diffracting light of said first restored beam, said non-diffracted beam and said second restored beam out of said substrate, said out-coupled beam being substantially parallel to said input beam.

9. The device of claim 8 wherein said optical engine comprises a micro-display to display a real image.

10. A method comprising providing at least one input beam and expanding said at least one input beam such that a virtual image is observable through a viewing aperture, said expanding comprising:
- diffracting light of said input beam into a substantially planar waveguiding substrate in order to provide an in-coupled beam propagating within said substrate;
- providing a first deflected beam by diffracting a part of said in-coupled beam by using a first deflecting grating portion such that the difference between the azimuth angle of said first deflected beam and the azimuth angle of said in-coupled beam is negative;
- providing a second deflected beam by diffracting a part of said in-coupled beam by using a second deflecting grating portion such that the difference between the azimuth angle of said second deflected beam and the azimuth angle of said in-coupled beam is positive;
- providing a first restored beam by diffracting a part of said first deflected beam by using a first restoring grating portion;
- providing a second restored beam by diffracting a part of said second deflected beam by using a second restoring grating portion, said second restored beam being substantially parallel to said first restored beam;
- providing a non-diffracted beam by guiding a part of said in-coupled beam within the substrate without being diffracted by said first deflecting grating portion, said second deflecting grating portion, said first restoring grating portion and said second restoring grating portion to provide a non-diffracted beam; and
- coupling light of said first restored beam, said non-diffracted beam and said second restored beam out of said substrate to provide an output beam such that said output beam is substantially parallel to said input beam;
- wherein said first deflecting grating portion comprises substantially linear diffractive features, and said second deflecting grating portion comprises substantially linear diffractive features, the diffractive features of said second deflecting grating portion having a different orientation than the diffractive features of said first deflecting grating portion.

11. The method of claim 10 wherein said first deflecting grating portion and said second restoring grating portion are on a first side of a reference plane, and said second deflecting grating portion and said first restoring grating portion are on a second side of said reference plane said reference plane being substantially perpendicular to the plane of said input grating.

12. A device comprising:
- a waveguiding means;
- a diffractive input means to provide an in-coupled beam propagating within a substrate by diffracting light of an input beam into said waveguiding means;
- a first deflecting means to provide a first deflected beam by diffracting a part of said in-coupled beam such that the difference between the azimuth angle of said first deflected beam and the azimuth angle of said in-coupled beam is negative, said first deflecting means comprising substantially linear diffractive features;
- a second deflecting means to provide a second deflected beam by diffracting a part of said in-coupled beam such that the difference between the azimuth angle of said second deflected beam and the azimuth angle of said in-coupled beam is positive, said second deflecting means comprising substantially linear diffractive features, the diffractive features of said second deflecting grating portion having a different orientation than the diffractive features of said first deflecting means;
- a first restoring means to provide a first restored beam by diffracting light of said first deflected beam;
- a second restoring means to provide a second restored beam, said second restored beam being substantially parallel to said first restored beam;
- wherein a non-diffracted beam is provided by guiding a part of said in-coupled beam within the substrate without being diffracted by said first deflecting means, said second deflecting means, said first restoring means and said second restoring means to provide a non-diffracted beam; and
- an output means to provide an out-coupled beam by diffracting light of said first restored beam, said non-diffracted beam and said second restored beam out of said substrate, said out-coupled beam being substantially parallel to said input beam.

13. The device of claim 12 wherein said first deflecting means and said second restoring means are on a first side of a plane, and said second deflecting means and said first restoring means are on a second side of said plane, a reference plane being substantially perpendicular to the plane of said diffractive input means.

* * * * *